March 14, 1961     J. T. LITTLE     2,974,411
PEELER FOR CITRUS FRUIT

Filed Dec. 4, 1959

INVENTOR.
J.T. LITTLE

BY

ATTORNEY

United States Patent Office 2,974,411
Patented Mar. 14, 1961

2,974,411
PEELER FOR CITRUS FRUIT
John Thomas Little, 1307 Ranger Road,
National City, Calif.
Filed Dec. 4, 1959, Ser. No. 857,415
2 Claims. (Cl. 30—24)

This invention relates to a tool for removing the rind or skin from oranges, lemons, grapefruits and like citrus fruits. In removing the rind from such fruits by cutting into them with a knife and pulling it off in several pieces by grasping each piece with the fingers, the meat or body of the fruit is often cut into and thus damaged somewhat. Also the operator's fingers become wet and often stained making the entire operation a messy one. The main purpose of this invention is to provide a simple tool whose use avoids the above objections and is capable of easily removing the entire rind from an orange in only two pieces.

Another object is to provide a tool having a sharp blade portion capable of cutting into the rind around a circumference of the fruit and a peeler portion adapted to be inserted into the cut so made and moved around the fruit between the rind and meat to separate the rind from the meat or body of the fruit.

A further object is to make the aforementioned blade and peeler portions of round wire which is much less expensive than the specially curved shapes of metal blades which have heretofore been used for peeling fruit.

Another object is to provide a handle in which the cutting blade and peeler portions are anchored, the handle being of a shape and size capable of being comfortably and firmly grasped by one hand of the operator while the fruit is held by his other hand. The handle is preferably made of wood or other inexpensive material so that the entire manufacturing cost of the tool is kept at a minimum.

Further objects and advantages will become apparent from a consideration of the following description and appended claims in conjunction with the accompanying drawings, in which:

Figure 2:
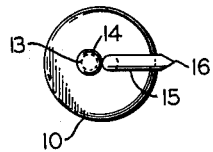
Fig. 2 is a top view of the peeler of Fig. 1.
Figure 1:
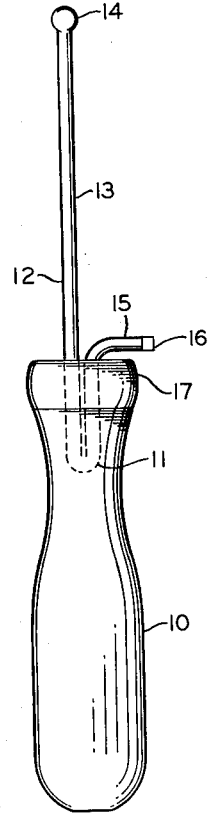
Fig. 1 is a front view of a citrus fruit peeler embodying the invention.

Referring to Figs. 1 and 2, the tool comprises a handle 10 which can be made of wood painted a bright color or of molded polyvinyl chloride plastic. The upper end of handle 10 is provided with a central recess in which the bent over lower portion of a round wire 12 has a press fit to firmly secure the wire and handle together. If the handle is composed of plastic, it may be molded about the bent portion of the wire. Wire 12 is preferably of a diameter between .091 and .133 inch to provide suitable strength and stiffness. The wire is preferably of aluminum, stainless steel or common steel chromium plated so that it is not chemically attacked by the juices of the fruit peeled. The vertical peeler limb 13 of the wire is straight and has a spherical shaped enlargement or head 14 on its end. The other limb of wire 12 has a 90 degree bend, as shown, to provide a horizontal cutting blade 15 which lies close to the top of handle 10. The end of blade 15 has two tapered faces to provide a vertical cutting edge 16 which is spaced from the curved side face 17 at the top of the handle approximately .25 inch for a purpose later described. The enlarged head 14 may be omitted in which case the end face of the wire is curved to a hemispherical shape, the radius of curvature of this face being preferably equal to the radius of the wire so as to avoid a sharp tip which would dig into the meat when removing the rind.

Figure 5:
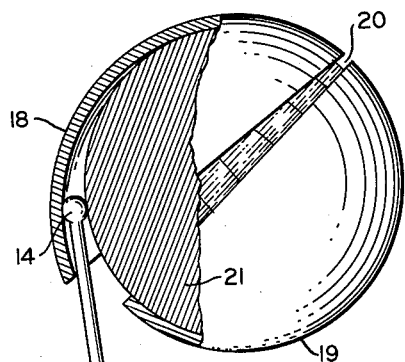
Fig. 5 is a view of an orange partly in section with the peeler in position removing the rind.

To remove the rind 18 from an orange 19 (Fig. 5) the tool is brought towards the fruit holding handle 10 with its axis approximately horizontal until curved portion 17 of the handle rests against rind 18 when cutting edge 16 has passed through the rind. The depth of penetration can be controlled by moving the handle through an angle while curved face 17 rests against the rind. This permits rinds of different thickness to be penetrated. The tool is now moved approximately horizontally around the circumference of the orange thereby making a narrow circumferential incision 20 through the rind only. The spherical head 14 is then entered in incision 20 and endwise pressure applied to handle 10 to cause about one inch of peeler portion 13 to enter the orange. As shown in Fig. 5, this advancement of head 14 between the rind and meat 21 of the orange causes separation of the rind from the meat along the region adjacent the path of travel of head 14. Keeping peeler portion 13 substantially tangential to the meat 21, the operator holds the orange in one hand and with his other hand moves the tool circumferentially around the orange. This causes a segment of the rind about an inch wide to be pried away from the meat all around the orange and leaves the top half of the rind still connected to the meat along a limited top region. By grasping the top half of the rind with the fingers of one hand and pulling, the top half is easily pulled off in one piece. The head 14 is then inserted between the meat and the lower section of the rind and the above described steps repeated to remove the rest of the rind.

Figure 4:
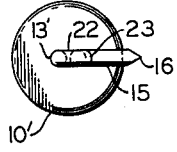
Fig. 4 is a top view of the peeler of Fig. 3.
Figure 3:
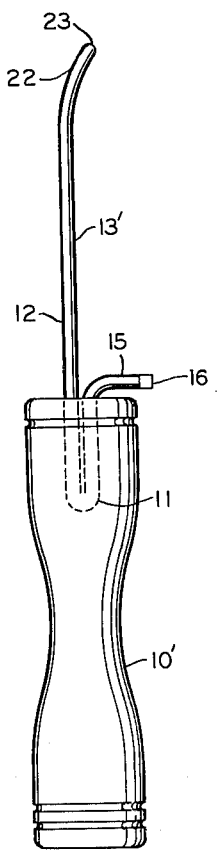
Fig. 3 is a front view showing a modified form of peeler.

The modified form of tool shown in Figs. 3 and 4 is generally similar to that above described except that handle 10' is of a different shape and the end of peeler portion 13' is not enlarged. Instead its tip portion 22 is curved with a radius of curvature of approximately one inch. Its end face 23 is preferably of hemispherical shape with a radius of curvature equal to one half the diameter of the wire so that the end is not sharp and will not dig into the meat 21. In using this tool the concave face of curved tip 22 is kept adjacent the meat as the end 23 is inserted in incision 20 and curved portion 22 is being pushed up between rind 18 and meat 21. The other steps taken to remove the rind are the same as those above described.

This invention may be embodied in other forms or carried out in other ways without departing from the spirit or essentials thereof. The present embodiment of the invention is therefore to be considered as in all respective illustrative and not restrictive, the scope of the invention being indicated by the following claims.

I claim:

1. A tool adapted to peel the rind from a citrus fruit comprising: a long handle having a deep vertical opening in its upper end; a rigid round wire having a diameter greater than .090 inch, the lower end of said wire being bent over substantially 180 degrees to form short and long vertical limbs which extend into said central opening and have a tight fit with the marginal wall thereof, said long vertical limb extending a substantial distance above said handle to provide a rind peeler, the tip portion of said peeler being curved lengthwise to a radius much greater than the diameter of said wire and the extreme end of said tip being rounded off to a radius equal to substantially one half the diameter of said wire.

2. A tool adapted to peel the rind from a citrus fruit comprising: a handle having a deep central opening in its upper end; a rigid round wire having a diameter between .091 inch and .133 inch, the lower end of said wire being bent over substantially 180 degrees to form short and long vertical limbs which extend into said central opening and have a tight fit with the marginal wall thereof, said long vertical limb extending a substantial distance above said handle to provide a rind peeler, the tip portion of said peeler being curved lengthwise to a radius of approximately 1 inch and the end face of said tip portion being rounded off to a radius equal to substantially one half the diameter of said wire.

References Cited in the file of this patent

UNITED STATES PATENTS

| | | |
|---|---|---|
| 355,308 | Foote | Jan. 4, 1887 |
| 1,472,462 | De Port | Oct. 30, 1923 |
| 2,900,717 | Byrd et al. | Aug. 25, 1959 |

FOREIGN PATENTS

| | | |
|---|---|---|
| 493,828 | Belgium | June 1, 1950 |